United States Patent
Lee et al.

(10) Patent No.: US 9,165,529 B2
(45) Date of Patent: Oct. 20, 2015

(54) STEREOSCOPIC IMAGE DISPLAY APPARATUS AND A STEREOSCOPIC IMAGE DISPLAY SYSTEM HAVING THE SAME

(71) Applicant: SAMSUNG DISPLAY CO., LTD., Gyeonggi-Do (KR)

(72) Inventors: Junpyo Lee, Chungcheongnam-do (KR); Hoisik Moon, Chungcheongnam-do (KR); Gwangho Nam, Chungcheongnam-do (KR); Hyun-Sik Yoon, Chungcheongnam-do (KR); ByungKil Jeon, Gyeonggi-do (KR); Jae-Seob Chung, Chungcheongnam-do (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 331 days.

(21) Appl. No.: 13/746,139

(22) Filed: Jan. 21, 2013

(65) Prior Publication Data
US 2013/0201181 A1    Aug. 8, 2013

(30) Foreign Application Priority Data
Feb. 8, 2012    (KR) .......................... 10-2012-0012921

(51) Int. Cl.
*H04N 13/04* (2006.01)
*G09G 5/14* (2006.01)
*G09G 3/00* (2006.01)
*G09G 3/20* (2006.01)

(52) U.S. Cl.
CPC .................. *G09G 5/14* (2013.01); *G09G 3/003* (2013.01); *G09G 3/20* (2013.01); *H04N 13/0438* (2013.01); *H04N 13/0497* (2013.01); *G09G 2310/08* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 2010/0060720 A1* | 3/2010 | Hirasawa | 348/49 |
| 2010/0259511 A1* | 10/2010 | Kimura et al. | 345/204 |
| 2011/0122126 A1* | 5/2011 | Han et al. | 345/419 |
| 2011/0128269 A1 | 6/2011 | Lee et al. | |
| 2011/0129269 A1 | 6/2011 | Seo et al. | |
| 2011/0148860 A1 | 6/2011 | Tsai et al. | |
| 2012/0249759 A1* | 10/2012 | Thorson | 348/56 |
| 2013/0057791 A1* | 3/2013 | Kitayama et al. | 349/15 |

FOREIGN PATENT DOCUMENTS

| | | |
|---|---|---|
| JP | 2010061105 | 3/2010 |
| JP | 2010528327 | 8/2010 |

(Continued)

*Primary Examiner* — Daniel Hajnik
(74) *Attorney, Agent, or Firm* — F. Chau & Associates, LLC

(57) ABSTRACT

A stereoscopic image display system includes a three-dimensional (3D) image signal generator, a display panel, a timing controller, a data driver, and a gate driver. The 3D image signal generator generates left-eye data and right-eye data on the basis of an image signal outputs the left-eye data and the right-eye data to the timing controller. The timing controller outputs the left-eye data and the right-eye data having a first frequency to the data driver in a first mode and outputs left-eye frame data and right-eye frame data having a second frequency to the data driver in a second mode. Two pixels, which are respectively connected to an i-th gate line and an (i+1)th gate line among the gate lines and to a same data line among the data lines, are operated with the same driving time in the first and second modes.

21 Claims, 11 Drawing Sheets

(56) References Cited

FOREIGN PATENT DOCUMENTS

| | | |
|---|---|---|
| KR | 1020000050024 | 8/2000 |
| KR | 1020090046424 | 5/2009 |
| KR | 1020100042954 | 4/2010 |
| KR | 1020100075206 | 7/2010 |
| KR | 20100139017 | 12/2010 |
| KR | 1020100128019 | 12/2010 |
| KR | 1020110055196 | 5/2011 |
| KR | 1020110062766 | 6/2011 |
| WO | WO2011/145584 A1 * 11/2011 | ............... G09G 3/36 |

* cited by examiner

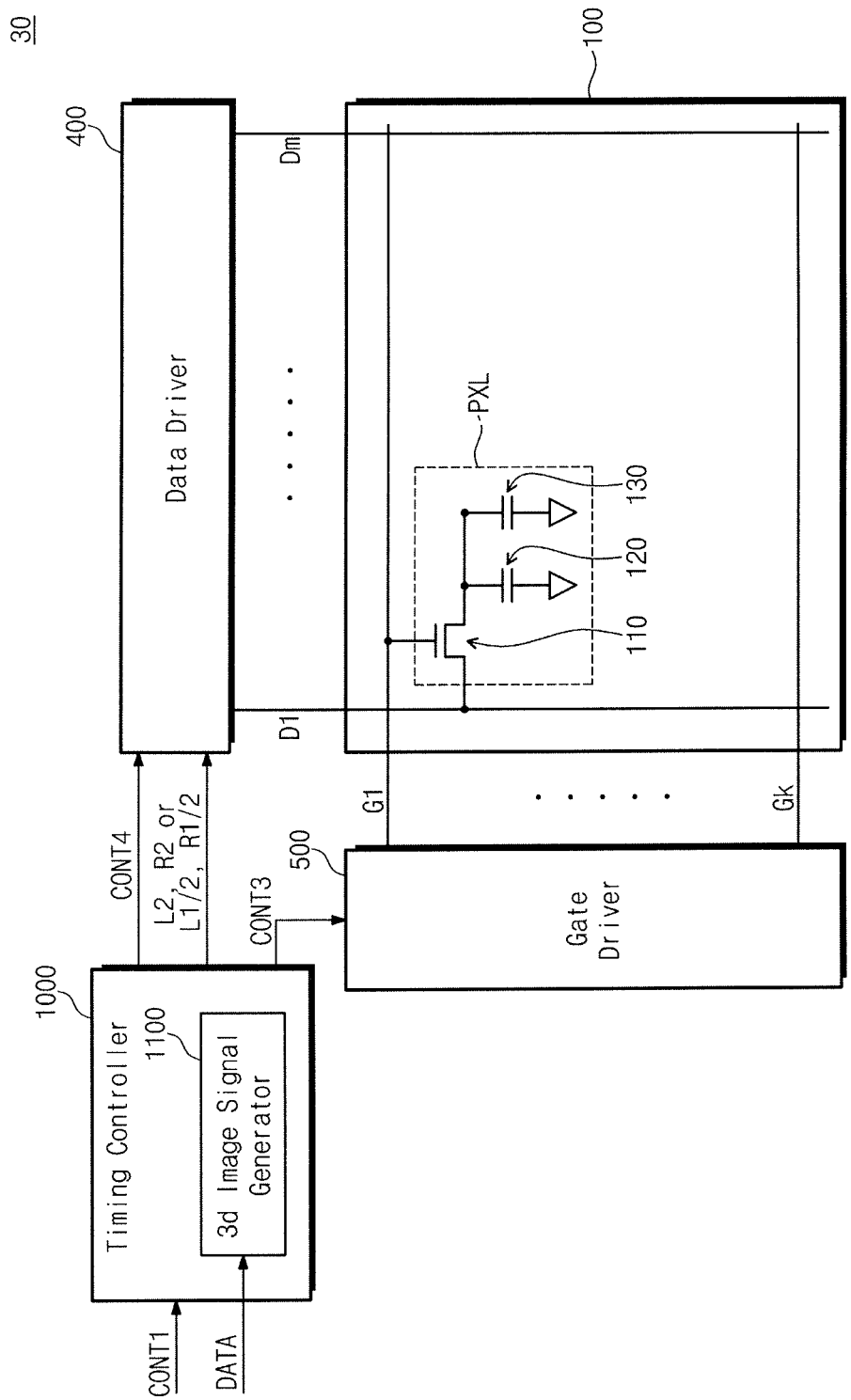

STEREOSCOPIC IMAGE DISPLAY APPARATUS AND A STEREOSCOPIC IMAGE DISPLAY SYSTEM HAVING THE SAME

CROSS-REFERENCE TO RELATED APPLICATION

This U.S. non-provisional patent application claims priority under 35 U.S.C. §119 to Korean Patent Application No. 10-2012-0012921, filed on Feb. 8, 2012, the disclosure of which is incorporated by reference herein in its entirety.

TECHNICAL FIELD

The present invention relates to a stereoscopic image display apparatus and a stereoscopic image display system having the same. More particularly, the present invention relates to a shutter-glasses type stereoscopic image display apparatus and a stereoscopic image display system having the stereoscopic image display apparatus.

DISCUSSION OF THE RELATED ART

In general, a shutter-glasses type stereoscopic image display apparatus alternately displays a left-eye image to a left eye of a viewer and a right-eye image to a right eye of the viewer. When the display apparatus displays the left-eye image, the shutter-glasses open the shutter of the left glass lens and close the shutter of the right glass lens. When the display apparatus displays the right-eye image, the shutter-glasses open the shutter of the right glass lens and close the shutter of the left glass lens. The viewer wearing the shutter-glasses combines the left-eye image with the right-eye image to generate the three-dimensional effect.

The stereoscopic image display apparatus includes a display panel, a data driver, and a gate driver. The display panel displays an image, and the data and gate drivers drive the display panel.

Since a manufacturing cost of the stereoscopic image display apparatus increases as a driving frequency of the data driver and the gate driver increases, the data and gate drivers operate at a relatively low driving frequency.

In addition, the stereoscopic image display apparatus includes a frame memory in which left-eye frame data and right-eye frame data are stored when the left-eye frame data and the right-eye frame data are input to the stereoscopic image display apparatus.

SUMMARY

An exemplary embodiment of the present invention provides a stereoscopic image display apparatus capable of displaying a three-dimensional (3D) image regardless of a driving frequency and having a reduced number of parts to decrease a manufacturing cost thereof.

An exemplary embodiment of the present invention provides a stereoscopic image display system having the stereoscopic image display apparatus.

An exemplary embodiment of the present invention provides a stereoscopic image display system that includes a display panel, a 3D image signal generator, a timing controller, a data driver, and a gate driver. The 3D image signal generator is configured to separate an image signal into first left-eye frame data and first right-eye frame data and downscale the first left-eye frame data and the first right-eye frame data to generate left-eye data and right-eye data, respectively.

The display panel includes data lines, gate lines, and pixels.

The timing controller is configured to receive the left-eye data and the right-eye data from the 3D image signal generator, output the left-eye data and the right-eye data during a first mode, and output second left-eye frame data and second right-eye frame data obtained by up-scaling the left-eye data and the right-eye data during a second mode.

The data driver is configured to output a first left-eye data voltage and a first right-eye data voltage, which are generated based on the left-eye data and the right-eye data, to the data lines at a first frequency during the first mode, and output a second left-eye data voltage and a second right-eye data voltage, which are generated based on the second left-eye frame data and the second right-eye frame data, to the data lines at a second frequency during the second mode.

The gate driver is configured to apply a first gate signal to the gate lines at the first frequency during the first mode and apply a second gate signal to the gate lines at the second frequency during the second mode.

Two pixels, which are respectively connected to an i-th gate line and an (i+1)th gate line among the gate lines and to a same data line among the data lines, have the same driving time in the first and second modes. The "i" is an odd number equal to or larger than 1.

The first gate signal has a pulse width about half a pulse width of the second gate signal.

The first frequency is about half the second frequency.

The 3D image signal generator includes: a data separator configured to separate the image signal into the first left-eye frame data and the first right-eye frame data; and a first scaler configured to generate the left-eye data and the right-eye data.

The first left-eye frame data comprises a plurality of left-eye row data respectively corresponding to one row of the pixels, the first right-eye frame data comprises a plurality of right-eye row data respectively corresponding to one row of the pixels, the left-eye data comprises a plurality of left-eye half-row data respectively corresponding to one row of the pixels, and the right-eye data comprises a plurality of right-eye half-row data respectively corresponding to one row of the pixels.

The first scaler generates the left-eye half-row data using half of the left-eye row data and generates the right-eye half-row data using half of the right-eye row data.

The first scaler sequentially outputs the left-eye half-row data and the right-eye half-row data.

The timing controller includes: a mode selector configured to select the first mode or the second mode; and a second scaler configured to up-scale the left-eye data and the right-eye data to double their resolution.

The timing controller receives the left-eye data and the right-eye data at the first frequency during the second mode and outputs the second left-eye frame data and the second right-eye frame data at the second frequency during the second mode.

The second scaler generates left-eye compensation data based on the left-eye half-row data and generates right-eye compensation data based on the right-eye half-row data.

A j-th left-eye compensation data of the left-eye compensation data has a data value obtained by interpolating a j-th left-eye half-row data and a (j+1)th left-eye half-row data among the left-eye half-row data, and a j-th right-eye compensation data of the right-eye compensation data has a data value obtained by interpolating a j-th right-eye half-row data and a (j+1)th right-eye half-row data among the right-eye half-row data, where j is a natural number.

The second left-eye data voltage comprises a left-eye data voltage obtained by converting the left-eye half-row data and a left-eye compensation voltage obtained by converting the left-eye compensation data, and the second right-eye data voltage comprises a right-eye data voltage obtained by converting the right-eye half-row data and a right-eye compensation voltage obtained by converting the right-eye compensation data.

The pixels comprise a first pixel connected to the i-th gate line and a second pixel connected to the (i+1)th gate line, the first pixel is applied with the left-eye data voltage or the right-eye data voltage, and the second pixel is applied with the left-eye compensation voltage or the right-eye compensation voltage.

The gate driver applies the second gate signal to the i-th gate line during a period in which the left-eye data voltage or the right-eye data voltage is applied to the first pixel, and applies the second gate signal to the (i+1)th gate line during a period in which the left-eye compensation voltage or the right-eye compensation voltage is applied to the second pixel.

The gate driver sequentially drives the gate lines.

The timing controller receives the left-eye data and the right-eye data at the first frequency during the first mode and outputs the left-eye data and the right-eye data at the first frequency.

The pixels comprise a first pixel connected to the i-th gate line and a second pixel connected to the (i+1)th gate line, and the first and second pixels are applied with the first left-eye data voltage or the first right-eye data voltage.

The gate driver applies a same gate signal to the i-th gate line and the (i+1)th gate line.

The gate driver sequentially drives the gate lines two at a time.

An exemplary embodiment of the present invention provides a stereoscopic image display apparatus that includes a display panel, a timing controller, a data driver, and a gate driver.

The display panel includes data lines, gate lines, and pixels.

The timing controller is configured to separate an image signal into first left-eye frame data and first right-eye frame data, scale the first left-eye frame data and the first right-eye frame data to generate left-eye data and right-eye data, respectively, wherein the left-eye data and the right-eye data have half the resolution of the first left-eye frame data and the first right-eye frame data, respectively, and output the left-eye data and the right-eye data or output second left-eye frame data and second right-eye frame data, which are obtained by scaling the left-eye data and the right-eye data to twice their resolution.

The data driver is configured to receive the second left and right-eye frame data or the left and right-eye data, convert the second left-eye frame data or the left-eye data to a left-eye data voltage, convert the second right-eye frame data or the right-eye data to a right-eye data voltage, output the left-eye data voltage to the data lines during a left-eye frame, and output the right-eye data voltage to the data lines during a right-eye frame.

The gate driver is configured to apply a gate signal to the gate lines during the left-eye frame and the right-eye frame, wherein two pixels, which are respectively connected to an i-th gate line and an (i+1)th gate line among the gate lines and to a same data line among the data lines, receive the same left-eye data voltage or the same right-eye data voltage in response to the timing controller outputting the left-eye data and the right-eye data to the data driver, where i is an odd number equal to or larger than 1.

The two pixels receive different left-eye data voltages or different right-eye data voltages in response to the timing controller outputting the second left-eye frame data and the second right-eye frame data to the data driver.

An exemplary embodiment of the present invention provides a stereoscopic image display that includes a 3D image signal generator configured to receive image data at a first frequency, separate the image data into first left and right-eye frame data and convert the first left and right-eye frame data into left and right-eye data, wherein the left and right-eye data have less resolution than the first left and right-eye frame data, respectively; and a timing controller configured, in a first mode, to receive the left and right-eye data and output the left and right-eye data to a data driver at the first frequency, and in a second mode, convert the left and right-eye data into second left and right-eye frame data and output the second left and right-eye frame data to the data driver at a second frequency about twice the first frequency, wherein the second left and right-eye frame data have the same resolution as the first left and right-eye frame data.

In the first mode a first gate line and a second gate line are activated at the same time so that a first pixel connected to the first gate line and a second pixel connected to the second gate line receive the same data voltage from the data driver, and in the second mode the first and second gate lines are activated at different times so that the first and second pixels receive different data voltages.

BRIEF DESCRIPTION OF THE DRAWINGS

The above and other features of the present invention will become more apparent by describing in detail exemplary embodiments thereof with reference to the accompanying drawings in which:

FIG. 10 is a block diagram showing a stereoscopic image display apparatus according to an exemplary embodiment of the present invention.

DETAILED DESCRIPTION OF EXEMPLARY EMBODIMENTS

Exemplary embodiments of the present invention will be described more fully hereinafter with reference to the accompanying drawings. However, the present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

As used herein, the singular forms, "a," "an" and "the" are intended to include the plural forms as well, unless the context clearly indicates otherwise.

Figure 1:
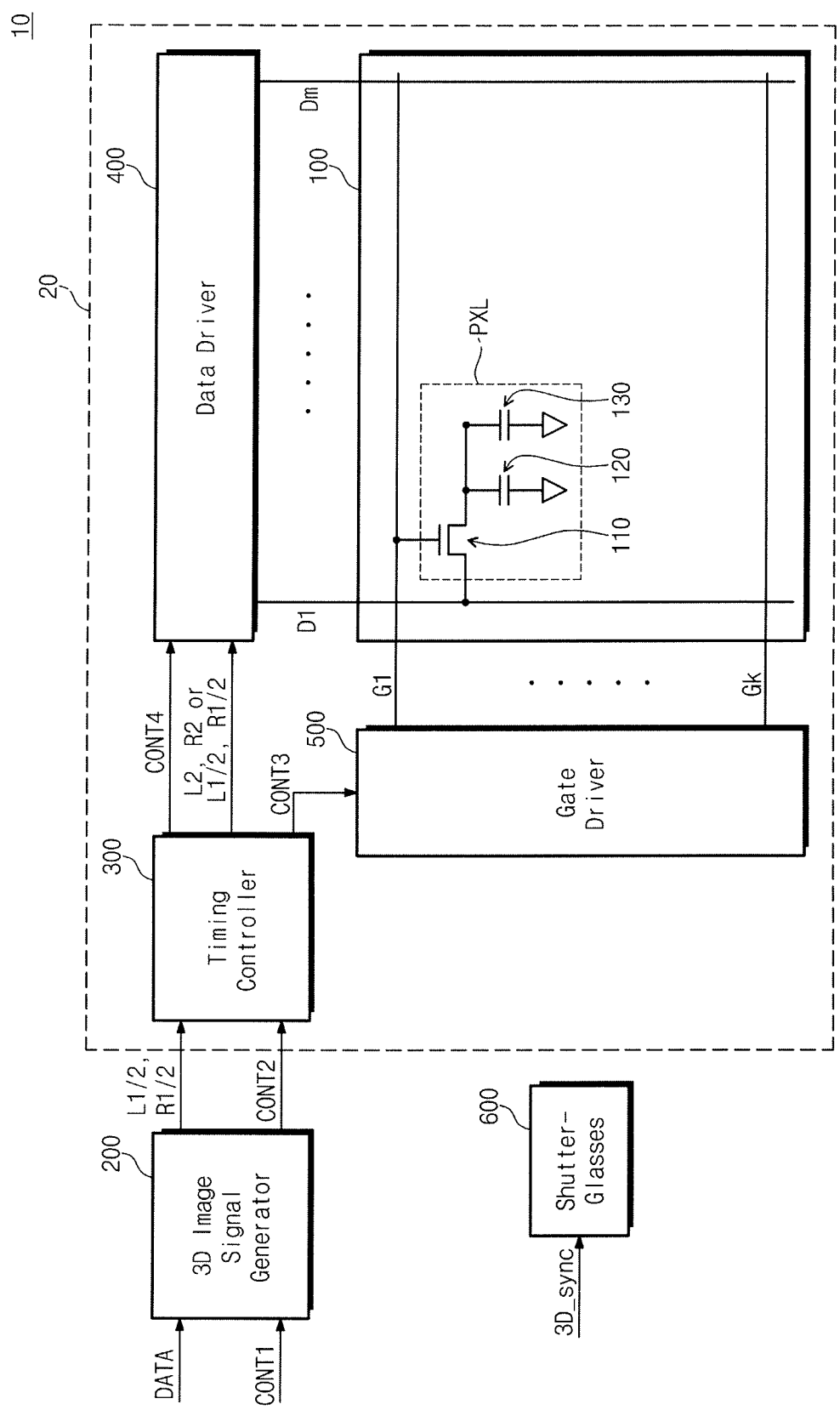
FIG. 1 is a block diagram showing a stereoscopic image display system according to an exemplary embodiment of the present invention.

FIG. 1 is a block diagram showing a stereoscopic image display system according to an exemplary embodiment of the present invention.

Referring to FIG. 1, a stereoscopic image display system 10 includes a three-dimensional (3D) image signal generator 200, a shutter-glasses 600, and a display apparatus 20. The display apparatus 20 includes a display panel 100 that displays an image, data and gate drivers 400 and 500 that drive the display panel 100, and a timing controller 300 that controls the data driver 400 and the gate driver 500.

The 3D image signal generator 200 may be included inside a set-top box (not shown) connected to the display apparatus 20. The 3D image signal generator 200 receives an image signal DATA and a first control signal CONT1 from an external video system (not shown). The 3D image signal generator 200 generates left-eye data L1/2 and right-eye data R1/2 on the basis of the image signal DATA and applies the left-eye data L1/2 and the right-eye data R1/2 to the timing controller 300. The first control signal CONT1 may include a two-dimensional (2D) image enable signal used to display a 2D image or a 3D image enable signal used to display a 3D image.

The timing controller 300 receives the left-eye data L1/2, the right-eye data R1/2, and a second control signal CONT2 from the 3D image signal generator 200. The second control signal CONT2 includes a panel driving signal to display the 2D image.

In addition, the timing controller 300 is operated in a first mode or a second mode in response to the panel driving signal. The timing controller 300 outputs the left-eye data L1/2 and the right-eye data R1/2 during the first mode and outputs second left-eye frame data L2 and second right-eye frame data R2 based on the left-eye data L1/2 and the right-eye data R1/2 during the second mode.

The second control signal CONT2 from the timing controller 300 may include a main clock signal, a vertical synchronization signal, a horizontal synchronization signal, and an image enable signal besides the panel driving signal. The timing controller 300 generates a gate control signal CONT3 used to control an operation of the gate driver 500 and a data control signal CONT4 used to control an operation of the data driver 400 on the basis of the second control signal CONT2 and applies the gate control signal CONT3 and the data control signal CONT4 to the gate driver 500 and the data driver 400, respectively.

The display panel 100 may be various display panels, such as an organic light emitting display panel, a liquid crystal display panel, a plasma display panel, an electrophoretic display panel, an electro-wetting display panel, etc. Hereinafter, the display panel 100 will be described as a liquid crystal display panel as a representative example.

The display panel 100 includes a plurality of gate lines G1 to Gk and a plurality of data lines D1 to Dm. The gate lines G1 to Gk are electrically insulated from the data lines D1 to Dm while crossing the data lines D1 to Dm. The display panel 100 includes a plurality of pixel areas arranged in a matrix form and a plurality of pixels respectively disposed in the pixel areas. In FIG. 1, an equivalent circuit of one pixel PXL has been shown. The pixel PXL includes a thin film transistor 110, a liquid crystal capacitor 120, and a storage capacitor 130.

Although not shown in FIG. 1, the thin film transistor 110 includes a gate electrode, a source electrode, and a drain electrode. The gate electrode is connected to a corresponding one, e.g., a first gate line G1, of the gate lines G1 to Gk. The source electrode is connected to a corresponding one, e.g., a first data line D1, of the data lines D1 to Dm. The drain electrode is connected to the liquid crystal capacitor 120 and the storage capacitor 130. The liquid crystal capacitor 120 and the storage capacitor 130 are connected to the drain electrode in parallel.

In addition, the display panel 100 includes a first display substrate, a second display substrate facing the first display substrate, and a liquid crystal layer interposed between the first display substrate and the second display substrate.

The gate lines G1 to Gk, the data lines D1 to Dm, the thin film transistor 110, and a pixel electrode (not shown) that serves as a first electrode of the liquid crystal capacitor 120 are disposed on the first display substrate. The thin film transistor 110 applies a data voltage to the pixel electrode in response to a gate signal.

The second display substrate includes a common electrode (not shown) that serves as a second electrode of the liquid crystal capacitor 120, and the common electrode is applied with a reference voltage. The liquid crystal layer disposed between the pixel electrode and the common electrode serves as a dielectric substance. The liquid crystal capacitor 120 is charged with a voltage corresponding to an electric potential difference between the data voltage and the reference voltage.

The gate driver 500 is electrically connected to the gate lines G1 to Gk disposed on the display panel 100 to apply a gate signal to the gate lines G1 to Gk. In detail, the gate driver 500 generates the gate signal to drive the gate lines G1 to Gk on the basis of the gate control signal CONT3 from the timing controller 300 and sequentially applies the gate signal to the gate lines G1 to Gk in a unit of one line. The gate signal includes a first gate signal and a second gate signal. The gate driver 500 applies the first gate signal to the gate lines G1 to Gk during the first mode and applies the second gate signal to the gate lines G1 to Gk during the second mode.

The gate control signal CONT3 includes a vertical start signal to start the operation of the gate driver 500 and a gate clock signal to determine an output timing of the gate signal.

The data driver 400 receives the left-eye data L1/2 and the right-eye data R1/2 from the timing controller 300 during the first mode. The data driver 400 converts the left-eye data L1/2 and the right-eye data R1/2 into a first left-eye data voltage and a first right-eye data voltage, respectively. The data driver 400 applies the first left-eye data voltage to the data lines D1 to Dm during a left-eye frame and applies the first right-eye data voltage to the data lines D1 to Dm during a right-eye frame.

The data driver 400 receives the second left-eye frame data L2 and the second right-eye frame data R2 from the timing controller 300 during the second mode. The data driver 400 converts the second left-eye frame data L2 and the second right-eye frame data R2 to a second left-eye data voltage and a second right-eye data voltage, respectively. The data driver 400 applies the second left-eye data voltage to the data lines D1 to Dm during the left-eye frame and applies the second right-eye data voltage to the data lines D1 to Dm during the right-eye frame.

The data control signal CONT4 includes a horizontal start signal to start the operation of the data driver 400, a polarity inversion signal to control the polarity of the first and second left-eye data voltages and the first and second right-eye data voltages, and a load signal to determine the output timing of the first and second left-eye data voltages and the first and second right-eye data voltages from the data driver 400.

The shutter-glasses 600 include a left-eye shutter (not shown) and a right-eye shutter (not shown). The shutter-glasses 600 receive a 3D synchronization signal 3D_sync. Responsive to the 3D synchronization signal 3D_sync, the shutter-glasses 600 open the left-eye shutter during the left-eye frame and close the right-eye shutter during the left-eye frame and open the right-eye shutter during the right-eye frame and close the left-eye shutter during the right-eye frame. In the present exemplary embodiment, the 3D synchronization signal 3D_sync is synchronized with a driving timing of the display panel 100. Accordingly, when the viewer wears the shutter-glasses 600, the viewer may observe a 3D image displayed on the display panel 100 through the left-eye shutter and the right-eye shutter.

Figure 2:
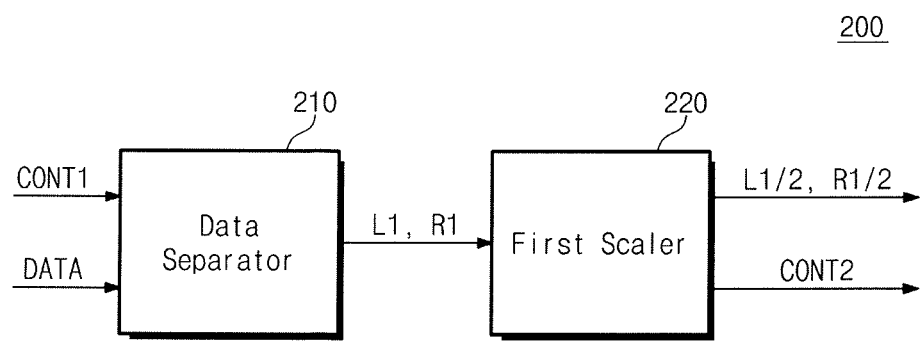
FIG. 2 is a block diagram showing a three-dimensional (3D) image signal generator shown in FIG. 1, according to an exemplary embodiment of the present invention.

FIG. 2 is a block diagram showing a 3D image signal generator shown in FIG. 1, according to an exemplary embodiment of the present invention.

Referring to FIG. 2, the 3D image signal generator 200 includes a data separator 210 and a first scaler 220.

The data separator 210 receives the image signal DATA and the first control signal CONT1. The image signal DATA may be the 2D image signal. The image signal DATA has a frame frequency of about 60 Hz. The image signal DATA may have other frame frequencies, for example, 120 Hz, 240 Hz, 360 Hz, etc. The data separator 210 is configured to separate the image signal DATA to first left-eye frame data L1 and first right-eye frame data R1 in response to the 3D image enable signal (included, e.g., in the first control signal CONT1). The data separator 210 applies the first left-eye frame data L1 and the first right-eye frame data R1 to the first scaler 220.

The first scaler 220 scales the first left-eye frame data L1 and the first right-eye frame data R1 to generate the left-eye data L1/2 and the right-eye data R1/2, each having a half resolution, when compared with that of the first left-eye frame data L1 and the first right-eye frame data R1. The first scaler 220 applies the left-eye data L1/2 and the right-eye data R1/2 to the timing controller 300.

Hereinafter, the 3D image signal generator 200 will be described in detail with reference to FIGS. 3A to 3C.

Figure 3A:
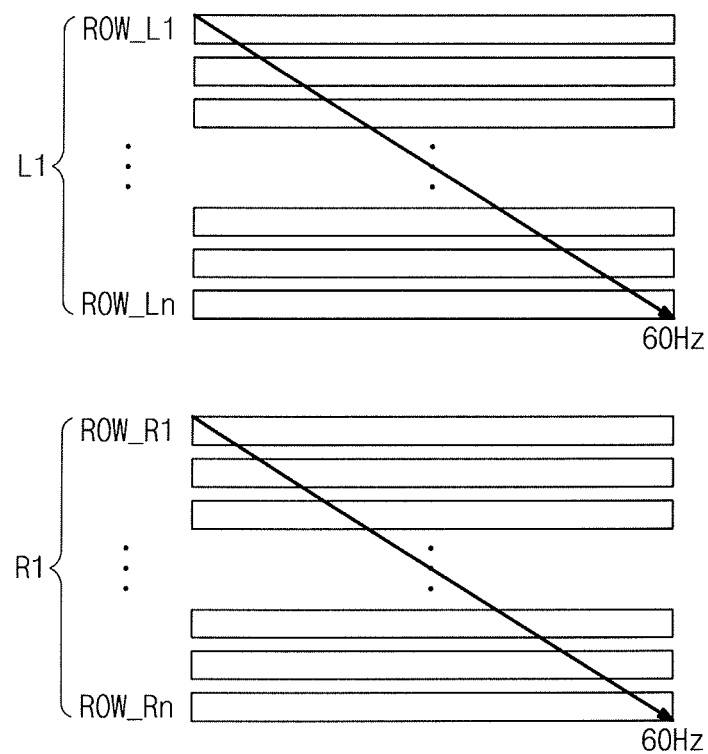
FIG. 3A is a view showing first left-eye frame data and first right-eye frame data, according to an exemplary embodiment of the present invention.

FIG. 3A is a view showing the first left-eye frame data L1 and the first right-eye frame data R1, according to an exemplary embodiment of the present invention.

Referring to FIG. 3A, the data separator 210 separates the image signal DATA corresponding to one frame of the 2D image into the first left-eye frame data L1 and the first right-eye frame data R1. The first left-eye frame data L1 corresponds to data of one frame of the 2D image and is output at a frame frequency of a first frequency of about 60 Hz. Although the first frequency described hereinafter is 60 Hz, the first frequency may have other values, for example, 120 Hz, 240 Hz, 360 Hz, etc. The first right-eye frame data R1 corresponds to data of one frame of the 2D image and is output at a frame frequency of the first frequency.

The first left-eye frame data L1 may include n left-eye row data ROW_µl to ROW_Ln. In the present exemplary embodiment, the number of the left-eye row data ROW_L1 to ROW_Ln is even. However, the number of left-eye row data ROW_L1 to ROW_Ln may be odd. The left-eye row data ROW_L1 to ROW_Ln are data signals respectively corresponding to the pixels arranged in one row among the pixels. For instance, a first left-eye row data ROW_L1 of the left-eye row data ROW_µl to ROW_Ln is the data signal corresponding to the pixels arranged in a first row. The first right-eye frame data R1 may include n right-eye row data ROW_R1 to ROW_Rn. In the present exemplary embodiment, the number of the right-eye row data ROW_R1 to ROW_Rn is even. However, the number of right-eye row data ROW_R1 to ROW_Rn may be odd. The right-eye row data ROW_R1 to ROW_Rn are data signals respectively corresponding to the pixels arranged in one row among the pixels. For instance, a first right-eye row data ROW_R1 of the right-eye row data ROW_R1 to ROW_Rn is the data signal corresponding to the pixels arranged in the first row.

Figure 3B:
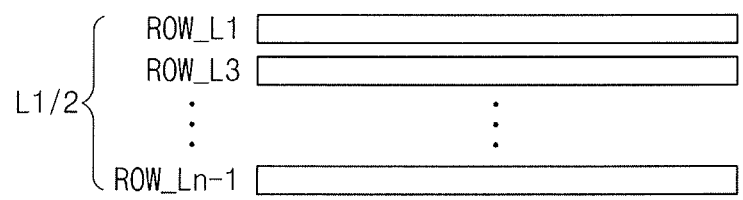
FIG. 3B is a view showing left-eye data and right-eye data which are generated by a first scaler, according to an exemplary embodiment of the present invention.
Figure 3B:
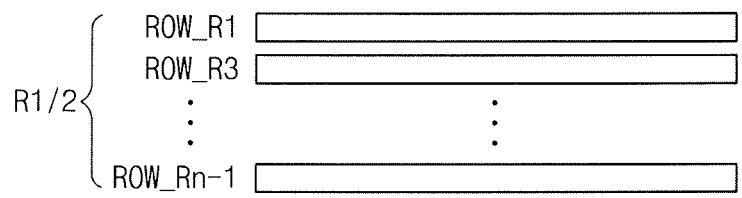
Figure 3C:
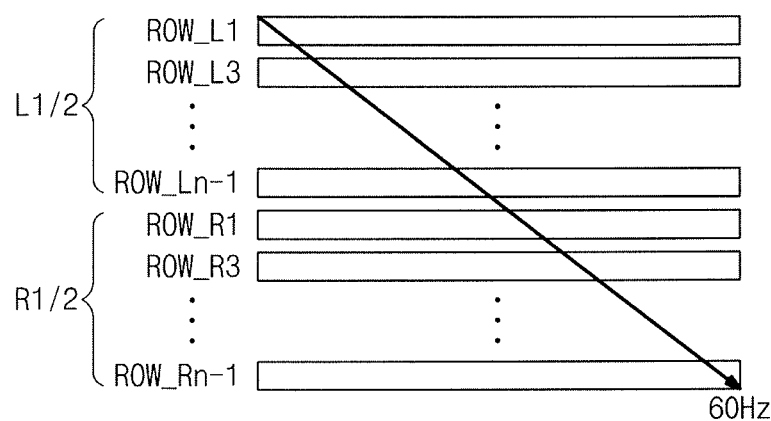
FIG. 3C is a view showing left-eye data and right-eye data which are provided to a timing controller, according to an exemplary embodiment of the present invention.

FIG. 3B is a view showing the left-eye data L1/2 and the right-eye data R1/2, which are generated by the first scaler 220 according to an exemplary embodiment of the present invention, and FIG. 3C is a view showing the left-eye data L1/2 and the right-eye data R1/2, which are provided to the timing controller 300 according to an exemplary embodiment of the present invention.

Referring to FIGS. 3A and 3B, the first scaler 220 selects n/2 data of n left-eye row data ROW_L1 to ROW_Ln and generates the left-eye data L1/2. The left-eye data L1/2 includes left-eye half-row data ROW_L1 to ROW_Ln−1. In detail, the left-eye half-row data ROW_L1 to ROW_Ln−1 may include odd-numbered left-eye row data or even-numbered left-eye row data. In addition, the left-eye row data ROW_L1 to ROW_Ln may be input to the first scaler 220 in the unit of two successive left-eye row data, and the first scaler 220 may select one left-eye row data of the two successive left-eye row data to generate the left-eye half-row data ROW_L1 to ROW_Ln−1. Hereinafter, the odd-numbered left-eye row data will be described as the left-eye half-row data ROW_L1 to ROW_Ln−1.

In addition, the first scaler 220 selects n/2 data of n right-eye row data ROW_R1 to ROW_Rn and generates the right-eye data R1/2. The right-eye data R1/2 includes right-eye half-row data ROW_R1 to ROW_Rn−1. In detail, the right-eye half-row data ROW_R1 to ROW_Rn−1 may include odd-numbered right-eye row data or even-numbered right-eye row data. In addition, the right-eye row data ROW_R1 to ROW_Rn may be input to the first scaler 220 in the unit of two successive right-eye row data, and the first scaler 220 may select one right-eye row data of the two successive right-eye row data to generate the right-eye half-row data ROW_R1 to ROW_Rn−1. Hereinafter, the odd-numbered right-eye row data will be described as the right-eye half-row data ROW_R1 to ROW_Rn−1.

Consequently, the left-eye data L1/2 is obtained by down-scaling the first left-eye frame data L1 in such a way that the first left-eye frame data L1 has the half resolution in a column direction of the pixels, and the right-eye data R1/2 is obtained by down-scaling first the right-eye frame data R1 in such a way that the first right-eye frame data R1 has the half resolution in the column direction of the pixels. The first scaler 220 transmits the one frame data configured to include the left-eye data L1/2 and the right-eye data R1/2, which are down-scaled.

Referring to FIG. 3C, the first scaler 220 may sequentially output the left-eye data L1/2 and the right-eye data R1/2. In detail, the right-eye half-row data ROW_R1 to ROW_Rn−1 may be output after the left-eye half-row data ROW_L1 to ROW_Ln−1 are sequentially output. In addition, on the contrary, the left-eye half-row data ROW_µl to ROW_Ln−1 may be output after the right-eye half-row data ROW_R1 to ROW_Rn−1 are sequentially output.

The first scaler 220 may output the left-eye data L1/2 and the right-eye data R1/2 at the first frequency. In this case, the left-eye data L1/2 and the right-eye data R1/2 may be output independently during approximately $\frac{1}{60}^{th}$ of a second.

Figure 4:
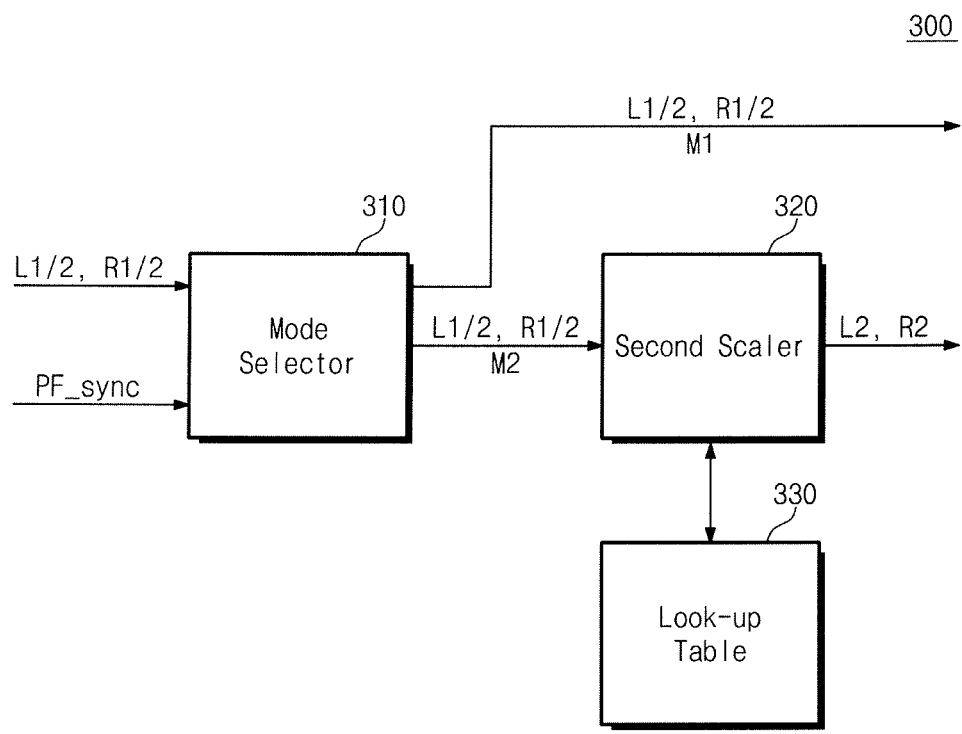
FIG. 4 is a block diagram showing a timing controller shown in FIG. 1, according to an exemplary embodiment of the present invention.

FIG. 4 is a block diagram showing a timing controller shown in FIG. 1, according to an exemplary embodiment of the present invention.

Referring to FIG. 4, the timing controller 300 includes a mode selector 310, a second scaler 320, and a look-up table 330.

The mode selector 310 receives the panel driving signal PF_sync (included, e.g., in the second control signal CONT2) and is operated in the first mode M1 or the second mode M2 in response to the panel driving signal PF_sync. In addition, the mode selector 310 receives the left-eye data L1/2 and the right-eye data R1/2.

The panel driving signal PF_sync includes information about the driving frequency of the data driver 400 and the gate driver 500.

In detail, the mode selector 310 is operated in the first mode M1 when the driving frequency of the data driver 400 and the gate driver 500 has the value of the first frequency. In the first mode M1, the mode selector 310 outputs the left-eye data L1/2 and the right-eye data R1/2 to the data driver 400.

The first frequency may have the value of about 60 Hz. In this case, the left-eye data L1/2 and the right-eye data R1/2 are output to the data driver 400 at the same frequency value as the frequency when they are input to the timing controller 300.

When the driving frequency of the data driver 400 and the gate driver 500 has the value of the second frequency, the mode selector 310 is operated in the second mode M2. In the second mode M2, the mode selector 310 outputs the left-eye data L1/2 and the right-eye data R1/2 to the second scaler 320. The second frequency may have a value two times larger than that of the first frequency. For instance, when the first frequency has the value of about 60 Hz, the second frequency has the value of about 120 Hz.

The second scaler 320 generates the second left-eye frame data L2 and the second right-eye frame data R2 by scaling the left-eye data L1/2 and the right-eye data R1/2 to allow the second left-eye frame data L2 and the second right-eye frame data R2 to have twice the resolution.

Figure 5:
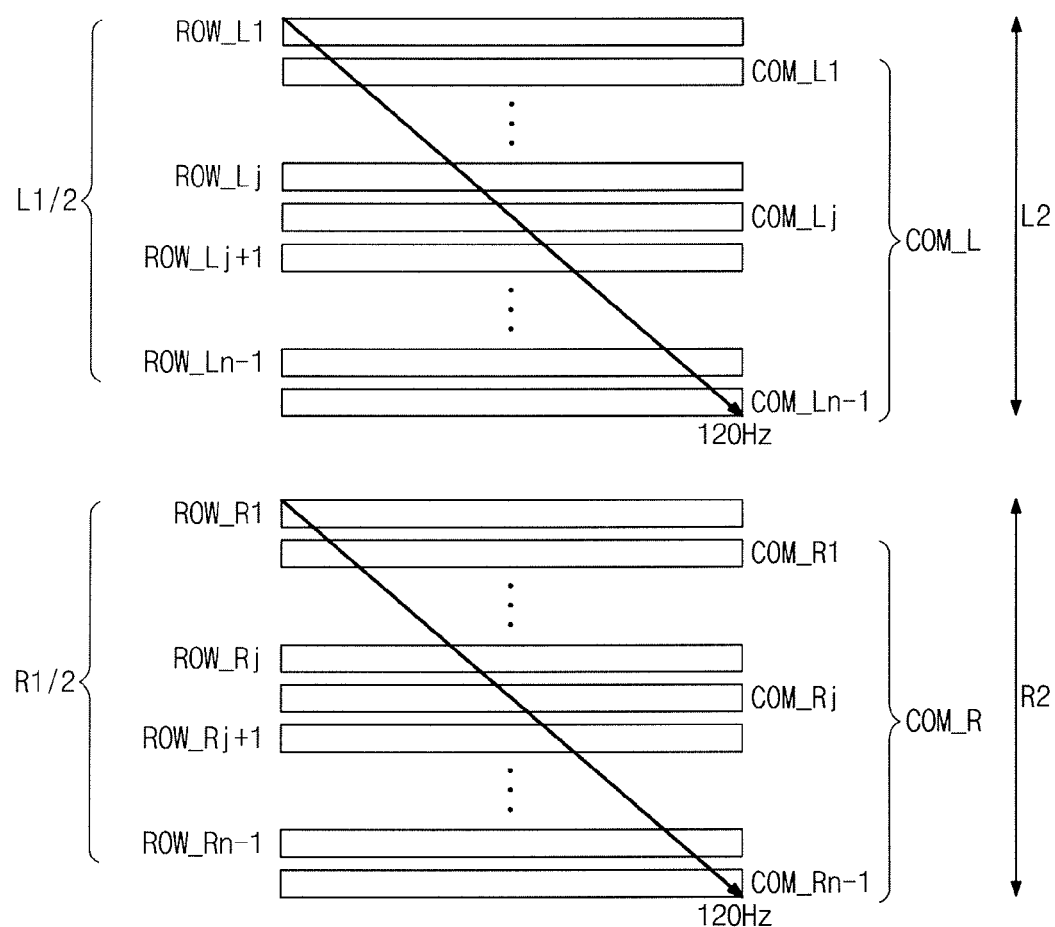
FIG. 5 is a view showing second left-eye frame data and second right-eye frame data, according to an exemplary embodiment of the present invention.

FIG. 5 is a view showing the second left-eye frame data L2 and the second right-eye frame data R2, according to an exemplary embodiment of the present invention.

Hereinafter, the process in which the second left-eye frame data L2 and the second right-eye frame data R2 are output from the timing controller 300 during the second mode M2 will be described with reference to FIGS. 4 and 5.

Referring to FIGS. 4 and 5, during the second mode M2, the second scaler 320 generates left-eye compensation data COM_L on the basis of the left-eye data L1/2 and generates right-eye compensation data COM_R on the basis of the right-eye data R1/2. The left-eye compensation data COM_L may include n/2 left-eye compensation data COM_L1 to COM_Ln−1, and the right-eye compensation data COM_R may include n/2 right-eye compensation data COM_R1 to COM_Rn−1.

In detail, the second scaler 320 generates a j-th left-eye compensation data COM_Lj (j is a natural number of 1≤j+1<n) between a j-th left-eye half-row data ROW_Lj and a (j+1)th left-eye half-row data ROW_Lj+1 among the left-eye data L1/2.

The j-th left-eye compensation data COM_Lj is a data value obtained by comparing the j-th left-eye half-row data ROWLj with the (j+1)th left-eye half-row data ROW_Lj+1 and interpolating the j-th left-eye half-row data ROW_Lj in accordance with the comparison result. The look-up table 330 previously stored data values corresponding to the left-eye compensation data COM_L1 to COM_Ln−1. The second scaler 320 reads out, from the look-up table 330, the data value corresponding to the j-th left-eye compensation data COM_Lj to generate the j-th left-eye compensation data COM_Lj. In other words, the second scaler 320 generates the data obtained by interpolating two successive left-eye half-row data and locates the data between the two successive left-eye half-row data, thereby generating the second left-eye frame data L2.

In addition, the second scaler 320 generates a j-th right-eye compensation data COM_Rj (j is a natural number of 1≤j+1<n) between a j-th right-eye half-row data ROW_Rj and a (j+1)th right-eye half-row data ROW_Rj+1 among the right-eye data R1/2.

The j-th right-eye compensation data COM_Rj is a data value obtained by comparing the j-th right-eye half-row data ROW_Rj with the (j+1)th right-eye half-row data ROW_Rj+1 and interpolating the j-th right-eye half-row data ROW_Rj in accordance with the comparison result. The look-up table 330 previously stored data values corresponding to the right-eye compensation data COM_R1 to COM_Rn−1. The second scaler 320 reads out, from the look-up table 330, the data value corresponding to the j-th right-eye compensation data COM_Rj to generate the j-th right-eye compensation data COM_Rj. In other words, the second scaler 320 generates the data obtained by interpolating two successive right-eye half-row data and locates the data between the two successive right-eye half-row data, thereby generating the second right-eye frame data R2.

The timing controller 300 outputs each of the second left-eye frame data L2 and the second right-eye frame data R2 at the second frequency. The second frequency has the value two times larger than that of the first frequency. For instance, when the first frequency has the value of about 60 Hz, the second frequency has the value of about 120 Hz. Each of the left-eye frame data L2 and the second right-eye frame data R2 have a data amount almost two times larger than each of the left-eye data L1/2 and the right-eye data R1/2 output from the timing controller 300, but a delay does not occur between a data input speed of the left and right-eye data L1/2 and R1/2 and a data output speed of the second left and right-eye frame data L2 and R2 since the second left and right-eye frame data L2 and R2 are output from the timing controller 300 at the second frequency.

The left-eye data L1/2 and the right-eye data R1/2 are sequentially input to the timing controller 300 at the first frequency. The second scaler 320 up-scales the left-eye data L1/2 to generate the second left-eye frame data L2 having the two-times higher resolution and outputs the second left-eye frame data L2 at the second frequency. When the second left-eye frame data L2 is completely output, the second right-eye frame data R2 is output at the second frequency. The timing controller 300 receives the first row data of the right-eye data R1/2 right after a last row data of the second left-eye frame data L2 is output from the timing controller 300. In addition, the timing controller 300 receives a first row data of left-eye data L1/2 of a next frame right after a last row data of the second right-eye frame data R2 is output from the timing controller 300.

The timing controller 300 may output the second left-eye frame data L2 and the second right-eye frame data R2 without storing the left-eye data L1/2 and the right-eye data R1/2 in a frame memory, which are sequentially input thereto. Thus, the timing controller 300 may be stably operated even though the timing controller 300 does not include the memory in which the left-eye data L1/2 and the right-eye data R1/2 are stored. In this case, however, the timing controller 300 may include one or two line memories to generate the left-eye compensation data COM_L and the right-eye compensation data COM_R.

Figure 6:
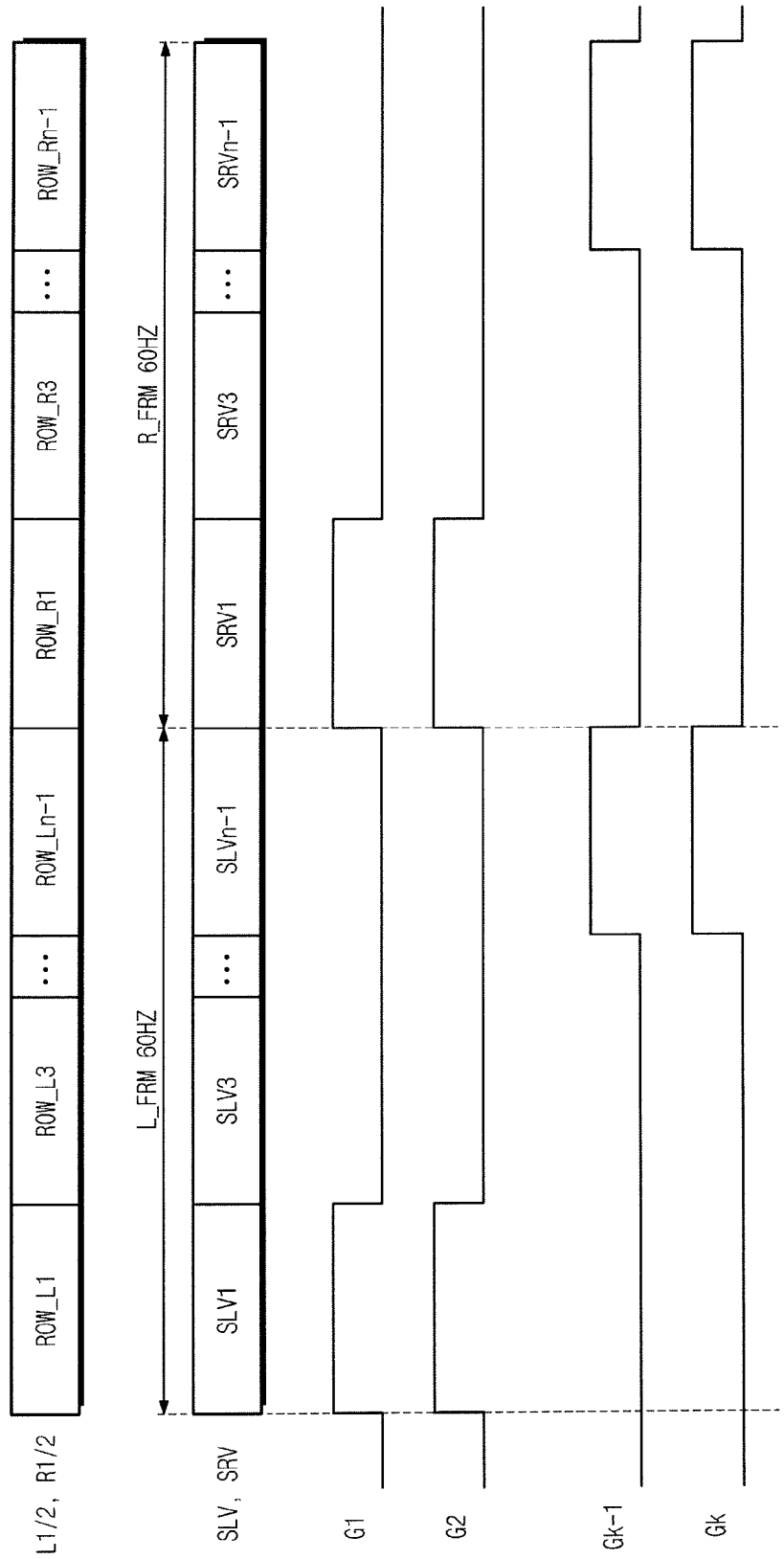
FIG. 6 is a timing diagram showing an operation of the stereoscopic image display system when a timing controller is operated in a first mode, according to an exemplary embodiment of the present invention.

FIG. 6 is a timing diagram showing an operation of the stereoscopic image display system 10 when the timing controller 300 is operated in the first mode M1, according to an exemplary embodiment of the present invention.

Referring to FIGS. 1 and 6, the data driver 400 receives the left-eye data L1/2 and the right-eye data R1/2 and converts the left-eye data L1/2 and the right-eye data R1/2 to the first left-eye data voltage SLV and the first right-eye data voltage SRV.

The first left-eye data voltage SLV may include n/2 first left-eye row voltages SLV1 to SLVn−1 obtained by converting the left-eye half-row data ROW_μl to ROW_Ln−1. The first right-eye data voltage SRV may include n/2 first right-eye row voltages SRV1 to SRVn−1 obtained by converting the right-eye half-row data ROW_R1 to ROW_Rn−1.

The data driver 400 outputs the first left-eye data voltage SLV to the data lines D1 to Dm at the first frequency during the left-eye frame L_FRM. The first frequency may be about 60 Hz. Thus, a time duration during which one of the first left-eye row voltages SLV1 to SLVn−1 is output from the data driver 400 is about (1/60)×(1/n) second.

In this case, the gate driver 500 sequentially drives the gate lines G1 to Gk in the unit of two gate lines in synchronization with the data driver 400. For instance, the gate driver 500 applies the first gate signal to a first gate line G1 and a second gate line G2, each having the same ON-time period, at a time point at which a first-first left-eye row voltage SLV1 is output to the data lines D1 to Dm.

The data driver 400 outputs the first right-eye data voltage SRV to the data lines D1 to Dm at the first frequency during the right-eye frame R_FRM. The first frequency may be about 60 Hz. Thus, a time duration during which one of the first right-eye row voltages SRV1 to SRVn−1 is output from the data driver 400 is about (1/60)×(1/n) second.

In this case, the gate driver 500 sequentially drives the gate lines G1 to Gk in the unit of two gate lines in synchronization with the data driver 400. For instance, the gate driver 500 applies the first gate signal to the first gate line G1 and the second gate line G2, each having the same ON-time period, at a time point at which a first-first right-eye row voltage SRV1 is output to the data lines D1 to Dm.

The driving frequency of the gate driver 500 has the same value as the first frequency. In other words, a pulse width of the gate signal applied to one of the gate lines G1 to Gk during the left-eye frame L_FRM or the right-eye frame R_FRM may be about (1/60)×(1/k) second. In this case, "k" may have the same value as that of "n."

The gate driver 500 is operated at the first frequency, but the gate driver 500 drives the gate lines G1 to Gk two at a time, since two gate lines are applied with the gate signal having the same ON-time period. Accordingly, the gate driver 500 may obtain the same effect as when the gate driver 500 is operated at the second frequency. In other words, although the data driver 400 and the gate driver 500 are operated at the first frequency of about 60 Hz during the left-eye frame L_FRM or the right-eye frame R_FRM, the stereoscopic image display system 10 is operated at the frequency of about 120 Hz to display the 3D image.

Figure 7:
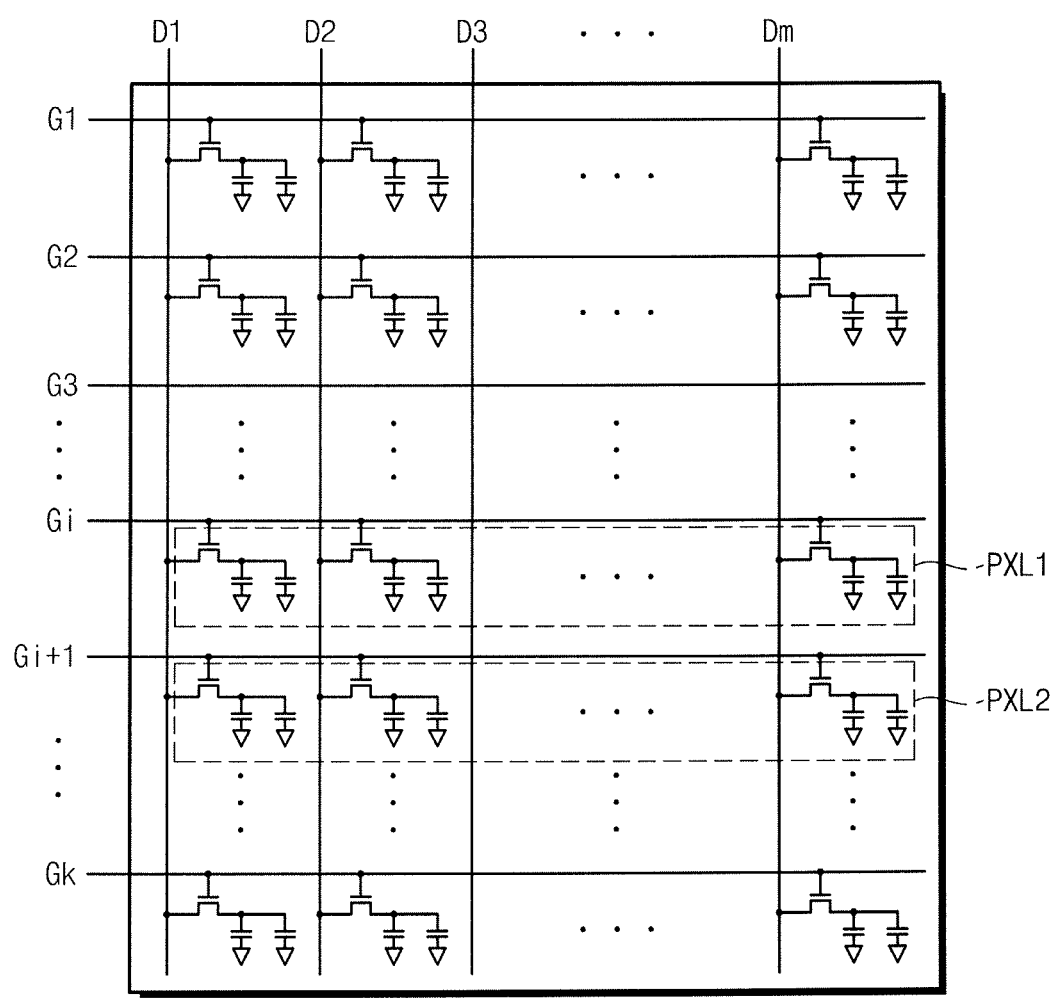
FIG. 7 is a view showing pixels applied with a first left-eye data voltage and a first right-eye data voltage, according to an exemplary embodiment of the present invention.

FIG. 7 is a view showing pixels applied with a first left-eye data voltage and a first right-eye data voltage, according to an exemplary embodiment of the present invention.

Referring to FIGS. 6 and 7, two pixels, which are respectively connected to an i-th gate line Gi (i is an odd number equal to or larger than 1) and an (i+1)th gate line Gi+1 among the gate lines G1 to Gk and to the same one data line among the data lines D1 to Dm, receive the same first left-eye row voltage (e.g. one of SLV1 to SLVn−1) or the same first right-eye row voltage (e.g. one of SRV1 to SRVn−1).

The pixels may include a first pixel PXL1 connected to the i-th gate line G1 and a second pixel PXL2 connected to the (i+1)th gate line Gi+1. One of the first left-eye row voltages SLV1 to SLVn or one of the first right-eye row voltages SRV1 to SRVn is substantially simultaneously applied to the first pixel PXL1 and the second pixel PXL2, while the i-th gate line Gi and the (i+1)th gate line Gi+1 are applied with the same gate signal. In other words, the first pixel PXL1 and the second pixel PXL2 are applied with the same data voltage.

Figure 8:
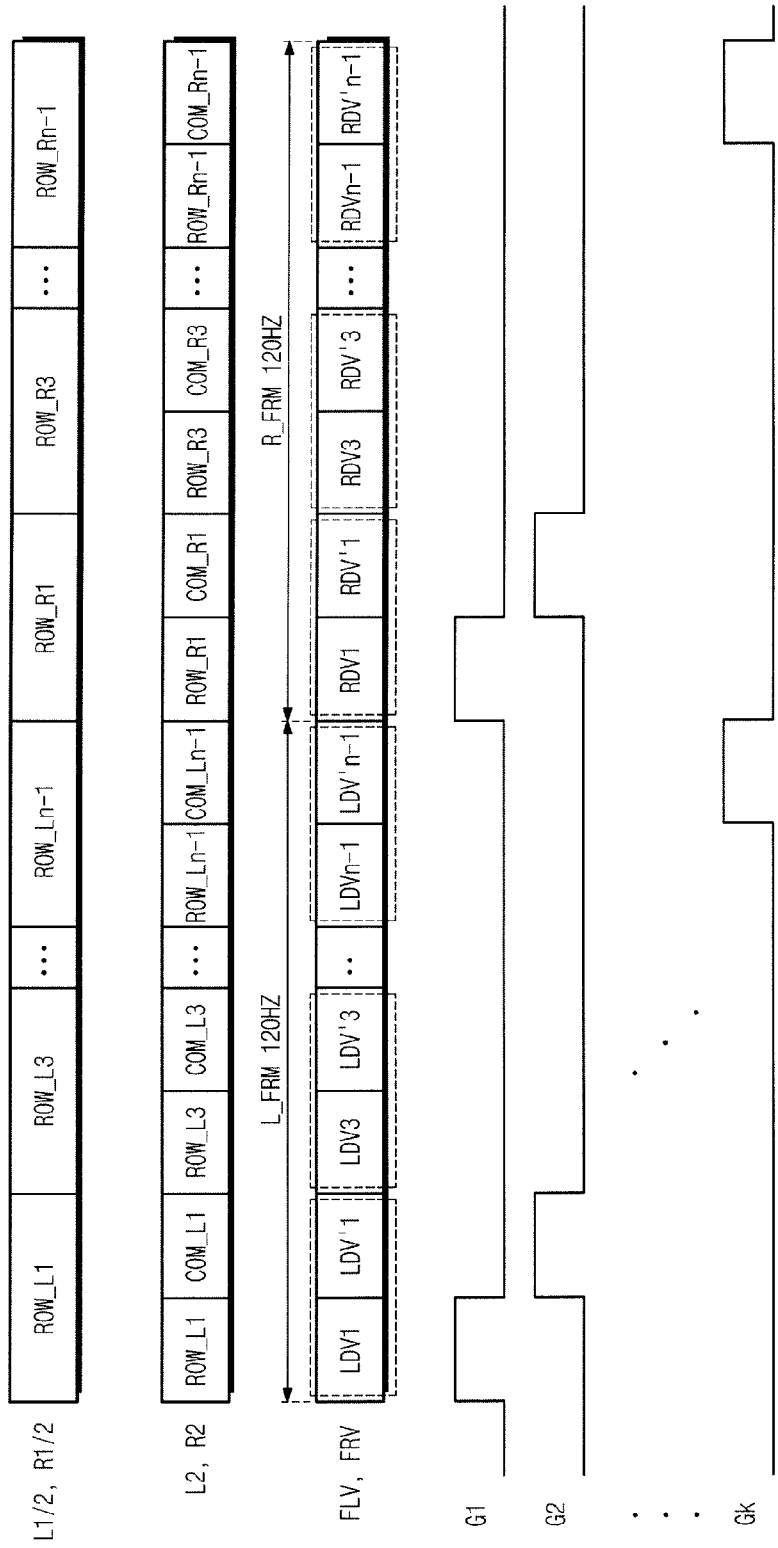
FIG. 8 is a timing diagram showing an operation of the stereoscopic image display system when a timing controller is operated in a second mode, according to an exemplary embodiment of the present invention.

FIG. 8 is a timing diagram showing an operation of the stereoscopic image display system 10 when the timing controller 300 is operated in the second mode M2, according to an exemplary embodiment of the present invention.

Referring to FIGS. 1 and 8, the data driver 400 receives the second left-eye frame data L2 and the second right-eye frame data R2 during the second mode M2 and converts the second left-eye frame data L2 and the second right-eye frame data R2 to the second left-eye data voltage FLV and the second right-eye data voltage FRV, respectively.

The second left-eye data voltage FLV may include n/2 second left-eye row voltages LDV1 to LDVn−1 and n/2 left-eye compensation voltages LDV'1 to LDV'n−1. The second left-eye row voltages LDV1 to LDVn−1 are data values obtained by converting the left-eye half-row data ROW_L1 to ROW_Ln−1, and the left-eye compensation voltages LDV'1 to LDV'n−1 are data values obtained by converting the left-eye compensation data COM_L1 to COM_Ln−1.

The second right-eye data voltage FRV may include n/2 second right-eye row voltages RDV1 to RDVn−1 and n/2 right-eye compensation voltages RDV'1 to RDV'n−1.

The second right-eye row voltages RDV1 to RDVn−1 are data values obtained by converting the right-eye half-row data ROW_R1 to ROW_Rn−1, and the right-eye compensation voltages RDV'1 to RDV'n−1 are data values obtained by converting the right-eye compensation data COM_R1 to COM_Rn−1.

The data driver 400 outputs the second left-eye data voltage FLV to the data lines D1 to Dm at the second frequency during the left-eye frame L_FRM. The second frequency may be about 120 Hz. Accordingly, a time duration during which one second left-eye row voltage (e.g., one of LDV1 to LDVn−1) or one left-eye compensation voltage (e.g., one of LDV' to LDV'n−1) is output from the data driver 400 is about (1/120)×(1/n) second.

In this case, the gate driver 500 sequentially drives the gate lines G1 to Gk in synchronization with the data driver 400. For instance, when the gate driver 500 applies a first-second gate signal to the first gate line G1, the data driver 400 outputs the first-second left-eye row voltage LDV1 to the data lines D1 to Dm. In addition, when the gate driver 500 applies a second-second gate signal to the second gate line G2, the data driver 400 outputs the first left-eye compensation voltage LDV'1 to the data lines D1 to Dm. The second gate signal may be a pulse signal and one second gate signal has the pulse width of about (1/120)×(1/k) second. In this case, "k" may have the same value as that of "n."

The data driver 400 outputs the second right-eye data voltage FRV to the data lines D1 to Dm at the second frequency during the right-eye frame R_FRM. The second frequency may be about 120 Hz. Thus, a time duration during which one second right-eye row voltage (e.g., one of RDV1 to RDVn−1) or one right-eye compensation voltage (e.g., one of RDV' to RDV'n−1) is output from the data driver 400 is about (1/120)×(1/n) second.

In this case, the gate driver 500 sequentially drives the gate lines G1 to Gk in synchronization with the data driver 400. For example, when the gate driver 500 applies the first-second gate signal to the first gate line G1, the data driver 400 outputs the first-second right-eye row voltage RDV1 to the data lines D1 to Dm. In addition, when the gate driver 500 applies the second-second gate signal to the second gate line G2, the data driver 400 outputs the first right-eye compensation voltage RDV'1 to the data lines D1 to Dm. The second gate signal may be a pulse signal and one second gate signal has the pulse width of about (1/120)×(1/k) second. In this case, "k" may have the same value as that of "n."

Thus, the driving frequency of the gate driver 500 has the same value as the second frequency.

Figure 9:
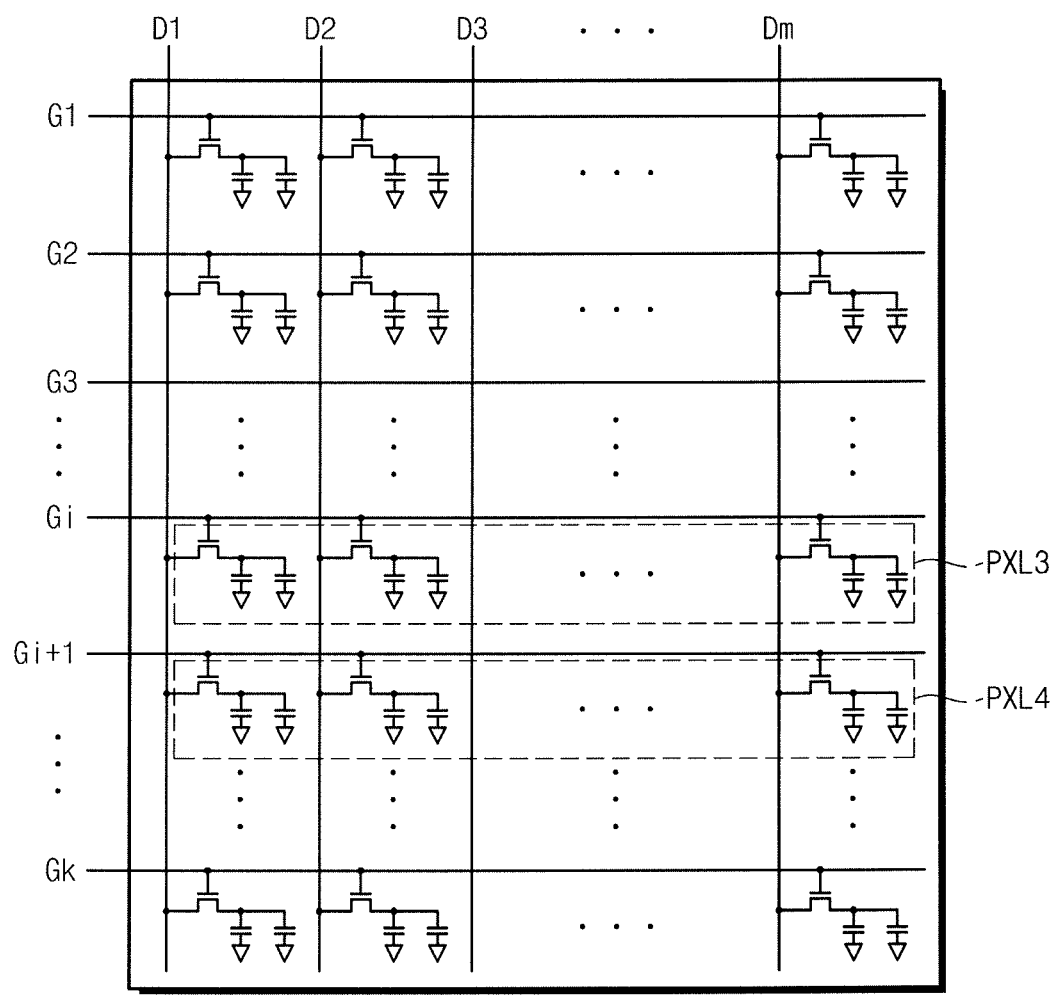
FIG. 9 is a view showing pixels applied with a second left-eye data voltage and a second right-eye data voltage, according to an exemplary embodiment of the present invention.

FIG. 9 is a view showing pixels applied with the second left-eye data voltage FLV and the second right-eye data voltage FRV, according to an exemplary embodiment of the present invention.

Referring to FIGS. 8 and 9, the pixels may include a third pixel PXL3 connected to the i-th gate line Gi and a fourth pixel PXL4 connected to the (i+1)th gate line Gi+1. The third pixel PXL3 may be applied with one of the second left-eye row voltages LDV1 to LDVn−1 or one of the second right-eye row voltages RDV1 to RDVn−1. The fourth pixel PXL4 may be applied with one of the left-eye compensation voltages LDV'1 to LDV'n−1 or one of the right-eye compensation voltages RDV'1 to RDV'n−1. In other words, the i-th second gate signal applied to the i-th gate line Gi and the (i+1)th second gate signal applied to the (i+1)th gate line Gi+1 have different ON-time periods from each other. Thus, the third pixel PXL3 and the fourth pixel PXL4 are applied with different data voltages from each other.

In the stereoscopic image display system 10, in the case that the gate driver 500 has the driving frequency of about 120 Hz, the display quality of the stereoscopic image display system 10 may be prevented from being deteriorated and the stereoscopic image display system 10 may display vivid 3D images even though the data signal input to the timing controller 300 has half the resolution of the 3D image signal. This may be achieved by the scaling process performed by the timing controller 300.

Referring to FIGS. 6 to 9, the driving time of the pixels, which are respectively connected to the i-th gate line Gi and the (i+1)th gate line Gi+1 among the gate lines G1 to Gk and to the same data line among the data lines D1 to Dm, in the first mode M1 may be the same as the driving time of the pixels in the second mode M2. In the first mode M1, the first gate signal having the pulse width of about (1/60)×(1/k) second is substantially simultaneously applied to the first and second pixels PXL1 and PXL2. In addition, the second gate signal having the pulse width of about (1/120)×(1/k) second is sequentially applied to the third and fourth pixels PXL3 and PXL4. In other words, the driving time of the two pixels in the first mode M1 may be the same as the driving time of the two pixels in the second mode M2, e.g., (1/60)×(1/k).

Accordingly, although the data driver 400 and the gate driver 500 has the driving frequency of about 60 Hz or about 120 Hz, the stereoscopic image display system 10 is operated at the frequency of about 120 Hz to display the 3D image.

FIG. 10 is a block diagram showing a stereoscopic image display apparatus according to an exemplary embodiment of the present invention.

Referring to FIG. 10, a display apparatus 30 includes a display panel 100, a data driver 400, a gate driver 500, and a timing controller 1000. The data driver 400 and the gate driver 500 shown in FIG. 10 have the same structure and function as those of the stereoscopic image display system 10 shown in FIG. 1, and thus detailed descriptions of the data driver 400 and the gate driver 500 will be omitted. Hereinafter, the timing controller 1000 will be described in detail.

The timing controller 1000 may include a 3D image signal generator 1100. In other words, the stereoscopic image display system 10 shown in FIG. 1 includes the 3D image signal generator 200 separated from the display apparatus 20, but the display apparatus 30 shown in FIG. 10 includes the 3D image signal generator 1100 is inside the timing controller 1000. The 3D image signal generator 1100 may have the same configuration as the 3D image signal generator 200 shown in FIG. 2.

Accordingly, the timing controller 1000 (by way of the 3D image signal generator 1100) separates the image signal DATA from an external device (not shown) into the first left-eye frame data L1 and the first right-eye frame data R1 and down-scales the first left-eye frame data L1 and the first right-eye frame data R1 to generate the left-eye data L1/2 and the right-eye data R1/2 each having the half resolution. The timing controller 1000 sequentially applies the left-eye data L1/2 and the right-eye data R1/2 to the data driver 400 during the first mode M1. During the second mode M2, the timing controller 1000 generates the second left-eye frame data L2 and the second right-eye frame data R2 using the left-eye data L1/2 and the right-eye data R1/2 and applies the second left-eye frame data L2 and the second right-eye frame data R2 to the data driver 400.

Then, the data driver 400 and the gate driver 500 perform the above-mentioned processes.

As described above, a stereoscopic image display system according to an exemplary embodiment of the present invention may display a 3D image using the data and gate drivers each having the driving frequency of about 60 Hz. In addition, the stereoscopic image display system may display the 3D image even though the data and gate drivers have the driving frequency of about 60 Hz or about 120 Hz.

In addition, the stereoscopic image display system may display the 3D image without using a frame memory for storing the left-eye frame data or the right-eye frame data when the left-eye frame data or the right-eye frame data, which are input to the display apparatus, has the frequency of about 60 Hz.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A stereoscopic image display system, comprising:
a three-dimensional (3D) image signal generator configured to separate an image signal into first left-eye frame data and first right-eye frame data and down-scale the first left-eye frame data and the first right-eye frame data to generate precede left-eye data and precede right-eye data, respectively;

a display panel including data lines, gate lines, and pixels;

a timing controller configured to receive the precede left-eye data and the precede right-eye data from the 3D image signal generator, output left-eye data and right-eye data during a first mode, and output second left-eye frame data and second right-eye frame data obtained by up-scaling the precede left-eye data and the precede right-eye data during a second mode;

a data driver configured to output a first left-eye data voltage and a first right-eye data voltage, which are generated based on the left-eye data and the right-eye data, to the data lines at a first frequency during the first mode, and output a second left-eye data voltage and a second right-eye data voltage, which are generated based on the second left-eye frame data and the second right-eye frame data, to the data lines at a second frequency during the second mode; and a gate driver configured to apply a first gate signal to the gate lines at the first frequency during the first mode and apply a second gate signal to the gate lines at the second frequency during the second mode, wherein two pixels, which are respectively connected to an i-th gate line and an (i+1)th gate line among the gate lines and to a same data line among the data lines, have a same driving time in the first and second modes, where i is an odd number equal to or larger than 1, wherein the precede left-eye data comprises a plurality of left-eye half-row data, and the precede right-eye data comprises a plurality of right-eye half-row data, wherein the timing controller generates left-eye compensation data based on the left-eye half-row data and generates right-eye compensation data based on the right-eye half-row data, wherein a j-th left-eye compensation data of the left-eye compensation data has a data value obtained by interpolating a j-th left-eye half-row data and a (j+1)th left-eye half-row data among the left-eye half-row data, and a j-th right-eye compensation data of the right-eye compensation data has a data value obtained by interpolating a j-th right-eye half-row data and a (j+1)th right-eye half-row data among the right-eye half-row data, where j is a natural number, and wherein the second left-eye data voltage comprises a left-eye data voltage obtained by converting the left-eye half-row data and a left-eye compensation voltage obtained by converting the left-eye compensation data, and the second right-eye data voltage comprises a right-eye data voltage obtained by converting the right-eye half-row data and a right-eye compensation voltage obtained by converting the right-eye compensation data.

2. The stereoscopic image display system of claim 1, wherein the second gate signal has a pulse width about half a pulse width of the first gate signal.

3. The stereoscopic image display system of claim 1, wherein the first frequency is about half the second frequency.

4. The stereoscopic image display system of claim 3, wherein the 3D image signal generator comprises:

a data separator configured to separate the image signal into the first left-eye frame data and the first right-eye frame data; and a first scaler configured to generate the precede left-eye data and the precede right-eye data.

5. The stereoscopic image display system of claim 4, wherein the first left-eye frame data comprises a plurality of left-eye row data respectively corresponding to one row of the pixels, the first right-eye frame data comprises a plurality of right-eye row data respectively corresponding to one row of the pixels, the precede left-eye data comprises the plurality of left-eye half-row data respectively corresponding to one row of the pixels, and the precede right-eye data comprises the plurality of right-eye half-row data respectively corresponding to one row of the pixels.

6. The stereoscopic image display system of claim 5, wherein the first scaler generates the left-eye half-row data using half of the left-eye row data and generates the right-eye half-row data using half of the right-eye row data.

7. The stereoscopic image display system of claim 6, wherein the first scaler sequentially outputs the left-eye half-row data and the right-eye half-row data.

8. The stereoscopic image display system of claim 7, wherein the timing controller comprises:

a mode selector configured to select the first mode or the second mode; and a second scaler configured to up-scale the precede left-eye data and the precede right-eye data to double their resolution.

9. The stereoscopic image display system of claim 8, wherein the timing controller receives the precede left-eye data and the precede right-eye data at the first frequency during the second mode and outputs the second left-eye frame data and the second right-eye frame data at the second frequency during the second mode.

10. The stereoscopic image display system of claim 9, wherein the second scaler generates the left-eye compensation data based on the left-eye half-row data and generates the right-eye compensation data based on the right-eye half-row data.

11. The stereoscopic image display system of claim 10, wherein the pixels comprise a first pixel connected to the i-th gate line and a second pixel connected to the (i+1)th gate line, the first pixel is applied with the left-eye data voltage or the right-eye data voltage, and the second pixel is applied with the left-eye compensation voltage or the right-eye compensation voltage.

12. The stereoscopic image display system of claim 11, wherein the gate driver applies the second gate signal to the i-th gate line during a period in which the left-eye data voltage or the right-eye data voltage is applied to the first pixel, and applies the second gate signal to the (i+1)th gate line during a period in which the left-eye compensation voltage or the right-eye compensation voltage is applied to the second pixel.

13. The stereoscopic image display system of claim 12, wherein the gate driver sequentially drives the gate lines.

14. The stereoscopic image display system of claim 8, wherein the timing controller receives the precede left-eye data and the precede right-eye data at the first frequency during the first mode and outputs the left-eye data and the right-eye data at the first frequency.

15. The stereoscopic image display system of claim 14, wherein the pixels comprise a first pixel connected to the i-th gate line and a second pixel connected to the (i+1)th gate line, and the first and second pixels are applied with the first left-eye data voltage or the first right-eye data voltage.

16. The stereoscopic image display system of claim 15, wherein the gate driver applies a same gate signal to the i-th gate line and the (i+1)th gate line.

17. The stereoscopic image display system of claim 16, wherein the gate driver sequentially drives the gate lines two at a time.

18. A stereoscopic image display apparatus, comprising:

a display panel including data lines, gate lines, and pixels;

a timing controller configured to separate an image signal into first left-eye frame data and first right-eye frame data, scale the first left-eye frame data and the first right-eye frame data to generate left-eye data and right-eye data, respectively, wherein the left-eye data and the right-eye data have half the resolution of the first left-eye frame data and the first right-eye frame data, respectively, and output the left-eye data and the right-eye data or output second left-eye frame data and second right-eye frame data, which are obtained by scaling the left-eye data and the right-eye data to twice their resolution;

a data driver configured to receive the second left and right-eye frame data or the left and right-eye data, convert the second left-eye frame data or the left-eye data to a left-eye data voltage, convert the second right-eye frame data or the right-eye data to a right-eye data voltage, output the left-eye data voltage to the data lines during a left-eye frame, and output the right-eye data voltage to the data lines during a right-eye frame; and a gate driver configured to apply a gate signal to the gate lines during the left-eye frame and the right-eye frame, wherein two pixels, which are respectively connected to an i-th gate line and an (i+1)th gate line among the gate lines and to a same data line among the data lines, receive the same left-eye data voltage or the same right-eye data voltage in response to the timing controller outputting the left-eye data and the right-eye data to the data driver, where i is an odd number equal to or larger than 1, wherein the left-eye data comprises a plurality of left-eye half-row data, and the right-eye data comprises a plurality of right-eye half-row data, wherein the timing controller generates left-eye compensation data based on the left-eye half-row data and generates right-eye compensation data based on the right-eye half-row data, wherein a j-th left-eye compensation data of the left-eye compensation data has a data value obtained by interpolating a j-th left-eye half-row data and a (j+1)th left-eye half-row data among the left-eye half-row data, and a j-th right-eye compensation data of the right-eye compensation data has a data value obtained by interpolating a j-th right-eye half-row data and a (j+1)th right-eye half-row data among the right-eye half-row data, where j is a natural number, and wherein the left-eye data voltage comprises a first left-eye data voltage obtained by converting the left-eye half-row data and a left-eye compensation voltage obtained by converting the left-eye compensation data, and the right-eye data voltage comprises a first right-eye data voltage obtained by converting the right-eye half-row data and a right-eye compensation voltage obtained by converting the right-eye compensation data.

19. The stereoscopic image display apparatus of claim 18, wherein the two pixels receive the first left-eye data voltage or the first right-eye data voltage in response to the timing controller outputting the second left-eye frame data and the second right-eye frame data to the data driver.

20. A stereoscopic image display, comprising:
a three-dimensional (3D) image signal generator configured to receive image data at a first frequency, separate the image data into first left and right-eye frame data and convert the first left and right-eye frame data into precede left and right-eye data, wherein the precede left and right-eye data have less resolution than the first left and right-eye frame data, respectively; and a timing controller configured, in a first mode, to receive the precede left and right-eye data and output the left and right-eye data to a data driver at the first frequency, and in a second mode, convert the precede left and right-eye data into second left and right-eye frame data and output the second left and right-eye frame data to the data driver at a second frequency about twice the first frequency, wherein the second left and right-eye frame data have the same resolution as the first left and right-eye frame data, wherein the precede left-eye data comprises a plurality of left-eye half-row data, and the precede right-eye data comprises a plurality of right-eye half-row data, wherein the timing controller generates left-eye compensation data based on the left-eye half-row data and generates right-eye compensation data based on the right-eye half-row data, wherein a j-th left-eye compensation data of the left-eye compensation data has a data value obtained by interpolating a j-th left-eye half-row data and a (j+1)th left-eye half-row data among the left-eye half-row data, and a j-th right-eye compensation data of the right-eye compensation data has a data value obtained by interpolating a j-th right-eye half-row data and a (j+1)th right-eye half-row data among the right-eye half-row data, where j is a natural number, wherein the data driver is configured to output a first left-eye data voltage and a first right-eye data voltage in the first mode and a second left-eye data voltage and a second right-eye data voltage in the second mode, and wherein the second left-eye data voltage comprises a left-eye data voltage obtained by converting the left-eye half-row data and a left-eye compensation voltage obtained by converting the left-eye compensation data, and the second right-eye data voltage comprises a right-eye data voltage obtained by converting the right-eye half-row data and a right-eye compensation voltage obtained by converting the right-eye compensation data.

21. The stereoscopic image display of claim 20, wherein in the first mode a first gate line and a second gate line are activated at the same time so that a first pixel connected to the first gate line and a second pixel connected to the second gate line receive the same data voltage from the data driver, and in the second mode the first and second gate lines are activated at different times so that the first and second pixels receive different data voltages.

* * * * *